(12) United States Patent
Ahmad et al.

(10) Patent No.: US 11,066,169 B2
(45) Date of Patent: Jul. 20, 2021

(54) DRONE FORKLIFT

(71) Applicant: Ford Global Technologies, LLC, Dearborn, MI (US)

(72) Inventors: Mohamed Ahmad, Dearborn, MI (US); Scott Vincent Myers, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 16/334,845

(22) PCT Filed: Sep. 26, 2016

(86) PCT No.: PCT/US2016/053744
§ 371 (c)(1),
(2) Date: Mar. 20, 2019

(87) PCT Pub. No.: WO2018/057034
PCT Pub. Date: Mar. 29, 2018

(65) Prior Publication Data
US 2020/0017218 A1 Jan. 16, 2020

(51) Int. Cl.
*B64D 9/00* (2006.01)
*B64C 39/02* (2006.01)

(52) U.S. Cl.
CPC ............. *B64D 9/00* (2013.01); *B64C 39/024* (2013.01); *B64C 2201/027* (2013.01); *B64C 2201/128* (2013.01)

(58) Field of Classification Search
CPC . B64D 9/00; B64C 39/024; G05D 2201/0216
See application file for complete search history.

(56) References Cited

U.S. PATENT DOCUMENTS

| 9,567,081 | B1* | 2/2017 | Beckman | B64C 1/22 |
| 9,650,136 | B1* | 5/2017 | Haskin | B64C 39/024 |
| 10,336,543 | B1* | 7/2019 | Sills | B64D 1/22 |
| 2014/0217230 | A1* | 8/2014 | Helou, Jr. | B64C 39/024 244/17.17 |
| 2015/0158587 | A1* | 6/2015 | Patrick | B64C 39/024 244/137.4 |

(Continued)

FOREIGN PATENT DOCUMENTS

| CN | 105923163 | * | 9/2016 | B64D 9/00 |
| CN | 111196365 | * | 5/2020 | B64D 9/00 |

(Continued)

*Primary Examiner* — Peter D Nolan
*Assistant Examiner* — Kenneth M Dunne
(74) *Attorney, Agent, or Firm* — Brandon Hicks; Eversheds Sutherland (US) LLP

(57) ABSTRACT

A UAV includes a fork lift system and a length component. The forklift system includes one or more elongated members extending at least partially in a horizontal direction. The forklift system also includes an extension mechanism configured to selectively retract and extend the one or more elongated members relative to an opposing surface. For example, the elongated members may include the tines of the fork or supporting member of the forklift system. The length component is configured to control the extension mechanism to adjust a distance between the opposing surface and the one or more elongated members to accommodate a payload.

19 Claims, 14 Drawing Sheets

(56) References Cited

U.S. PATENT DOCUMENTS

| | | | | |
|---|---|---|---|---|
| 2016/0236772 A1* | 8/2016 | Tang | ................... | B64C 39/024 |
| 2017/0213062 A1* | 7/2017 | Jones | ................... | G06K 9/0063 |
| 2018/0053275 A1* | 2/2018 | Jones | ................... | G05D 1/0088 |
| 2018/0354625 A1* | 12/2018 | Verkade | ................ | B64C 39/024 |
| 2019/0250643 A1* | 8/2019 | Takizawa | ................ | G08G 5/00 |

FOREIGN PATENT DOCUMENTS

| | | | | |
|---|---|---|---|---|
| WO | WO2014/080286 A2 * | 3/2014 | ............... | B64D 9/00 |
| WO | WO2014080386 A2 * | 3/2014 | ............. | B64C 27/08 |

\* cited by examiner

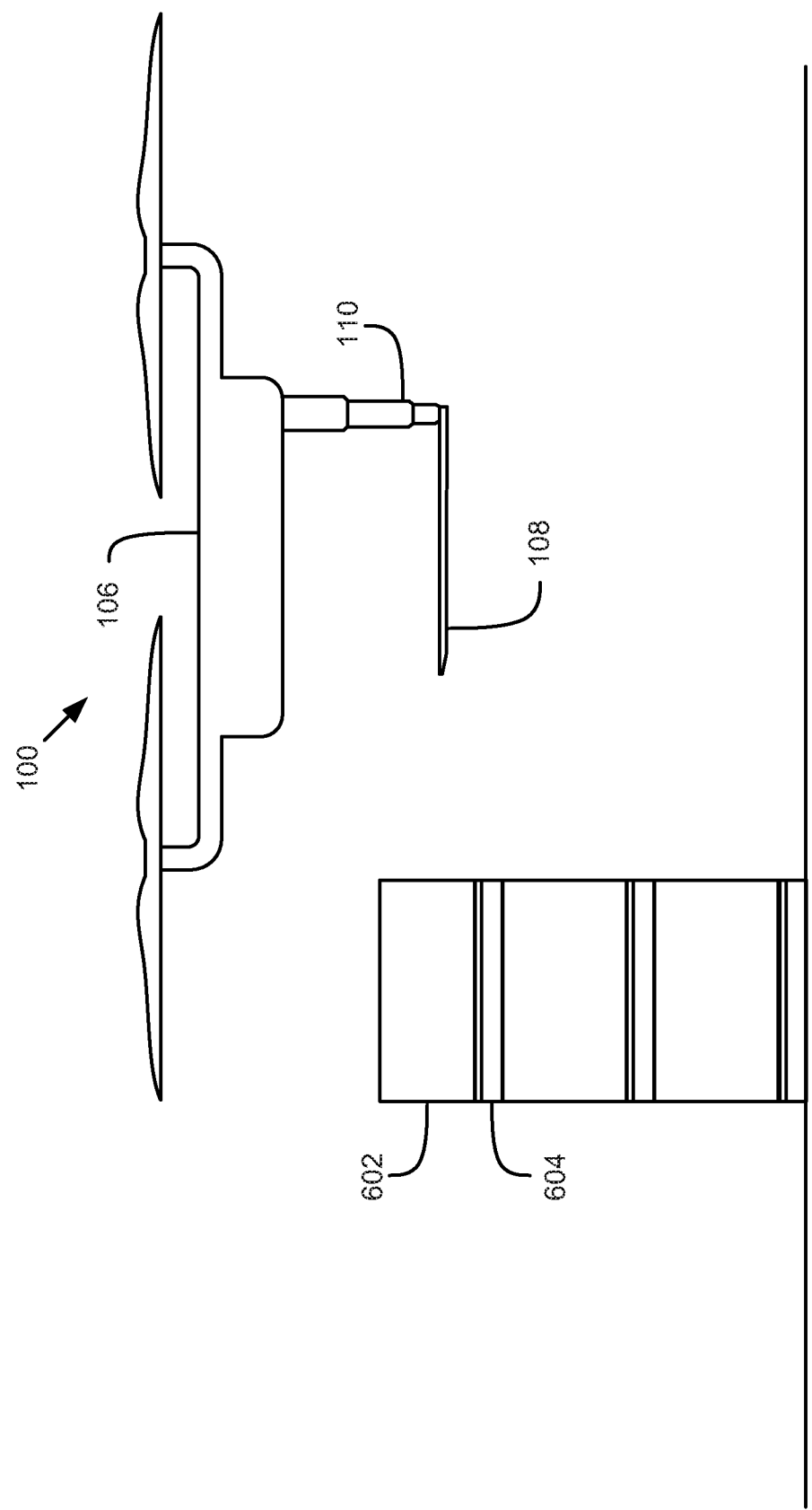

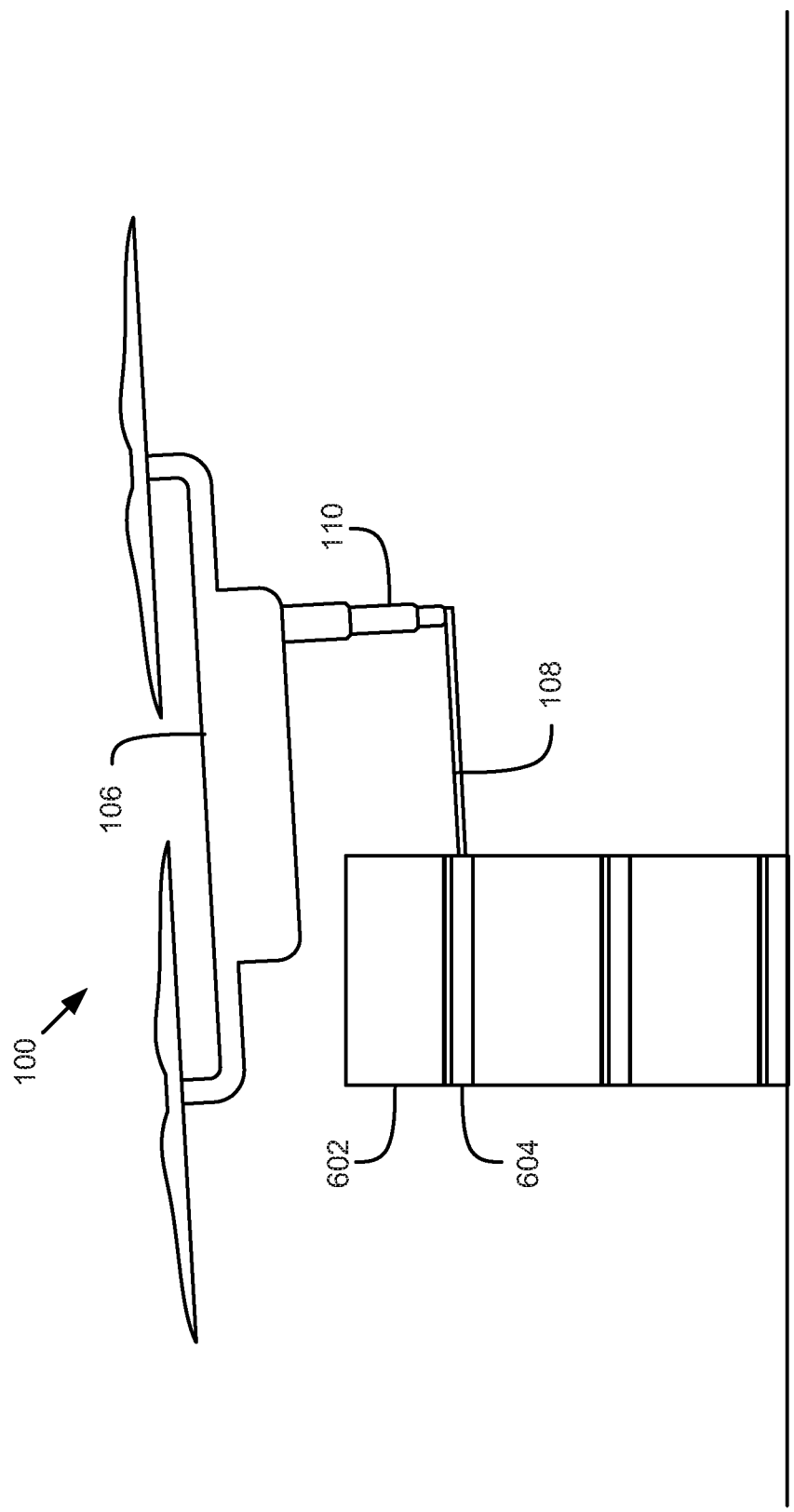

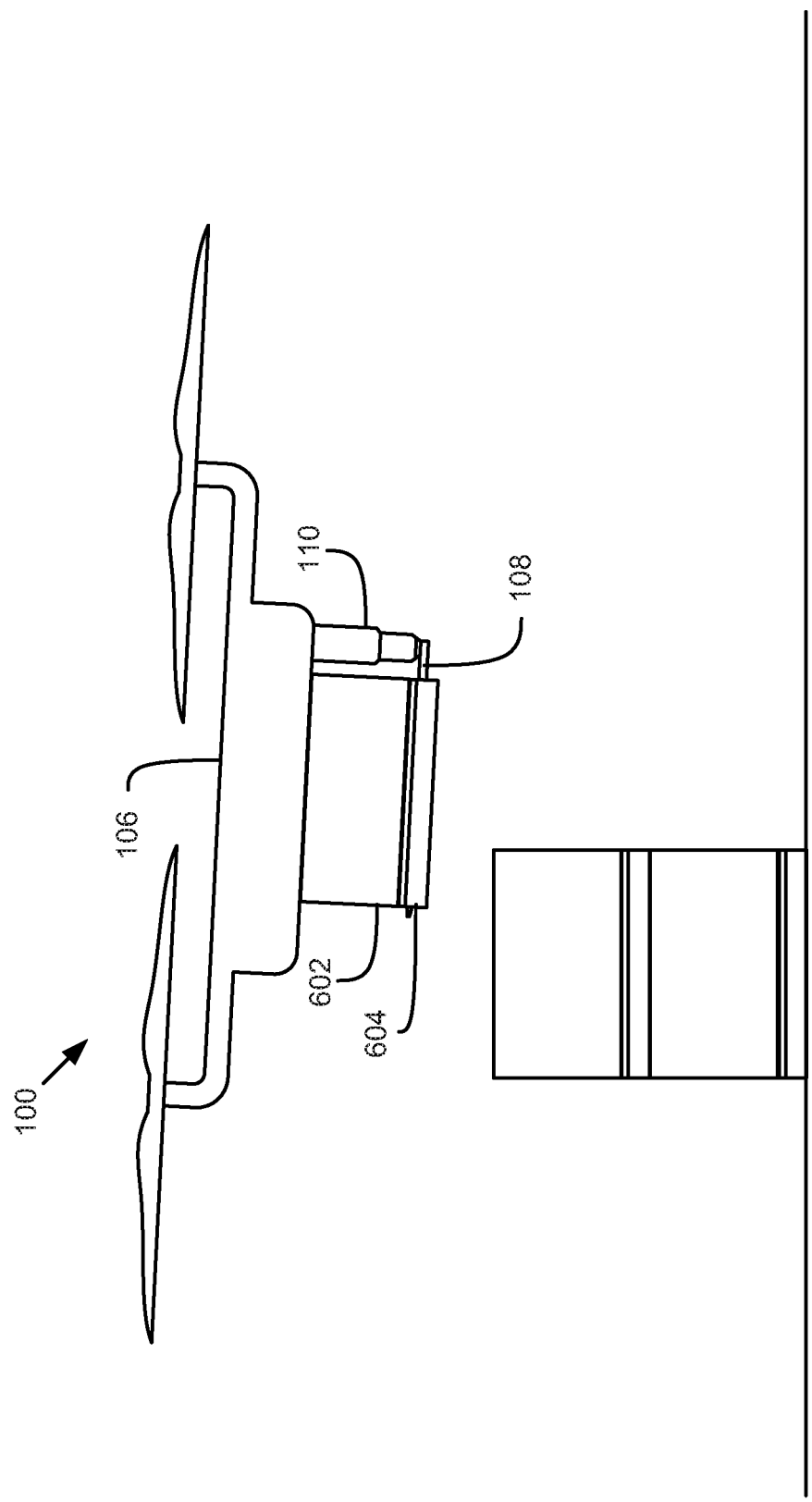

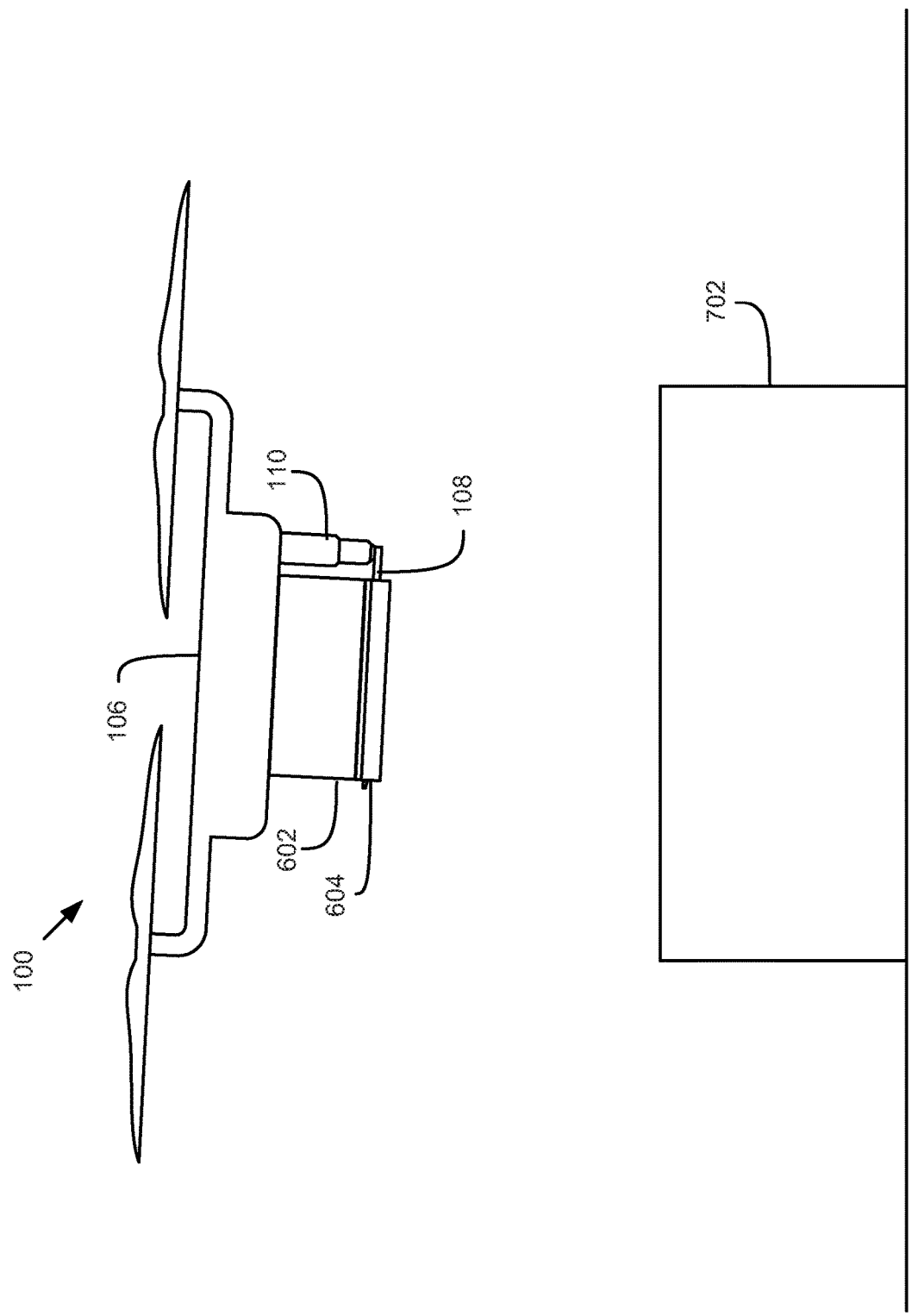

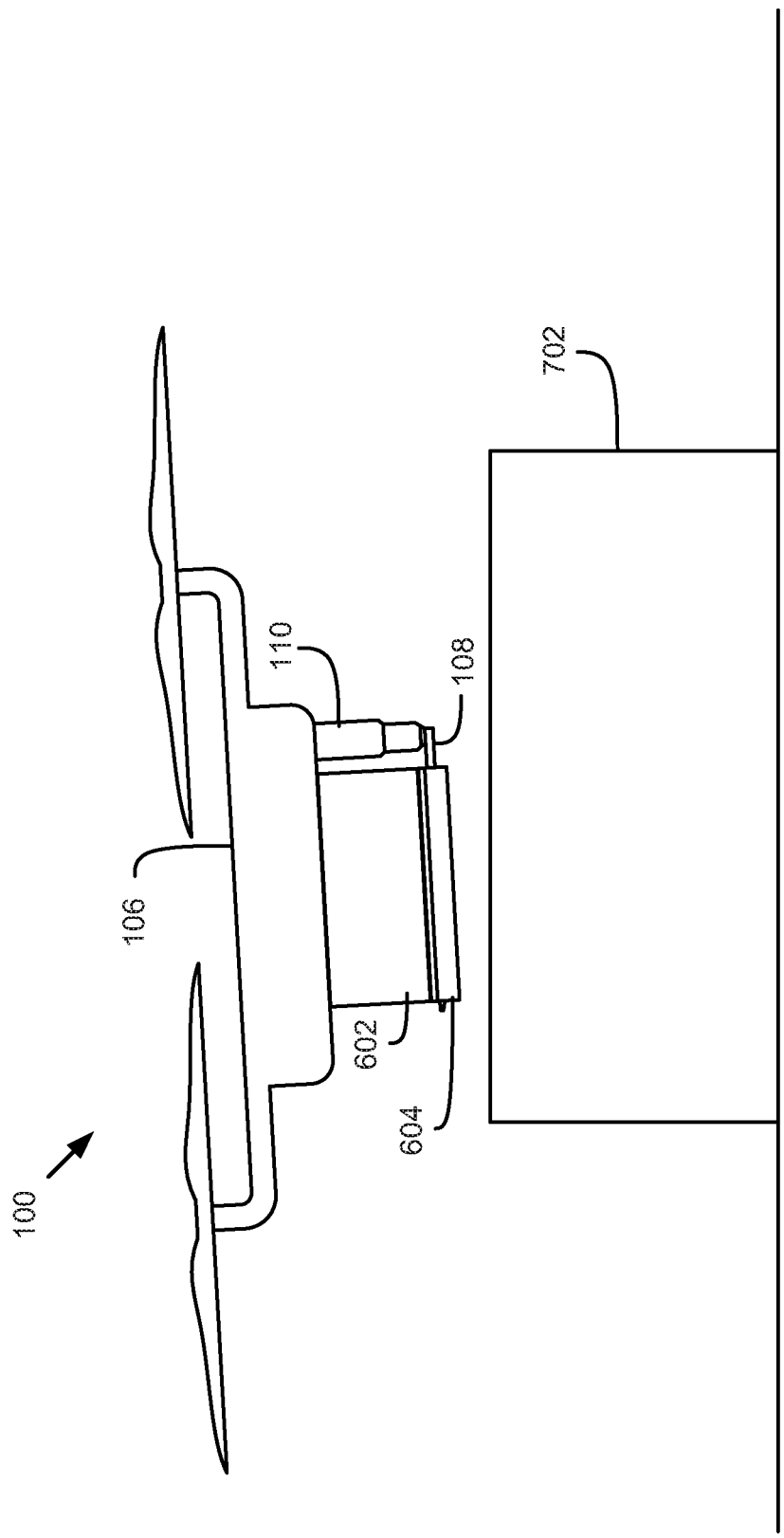

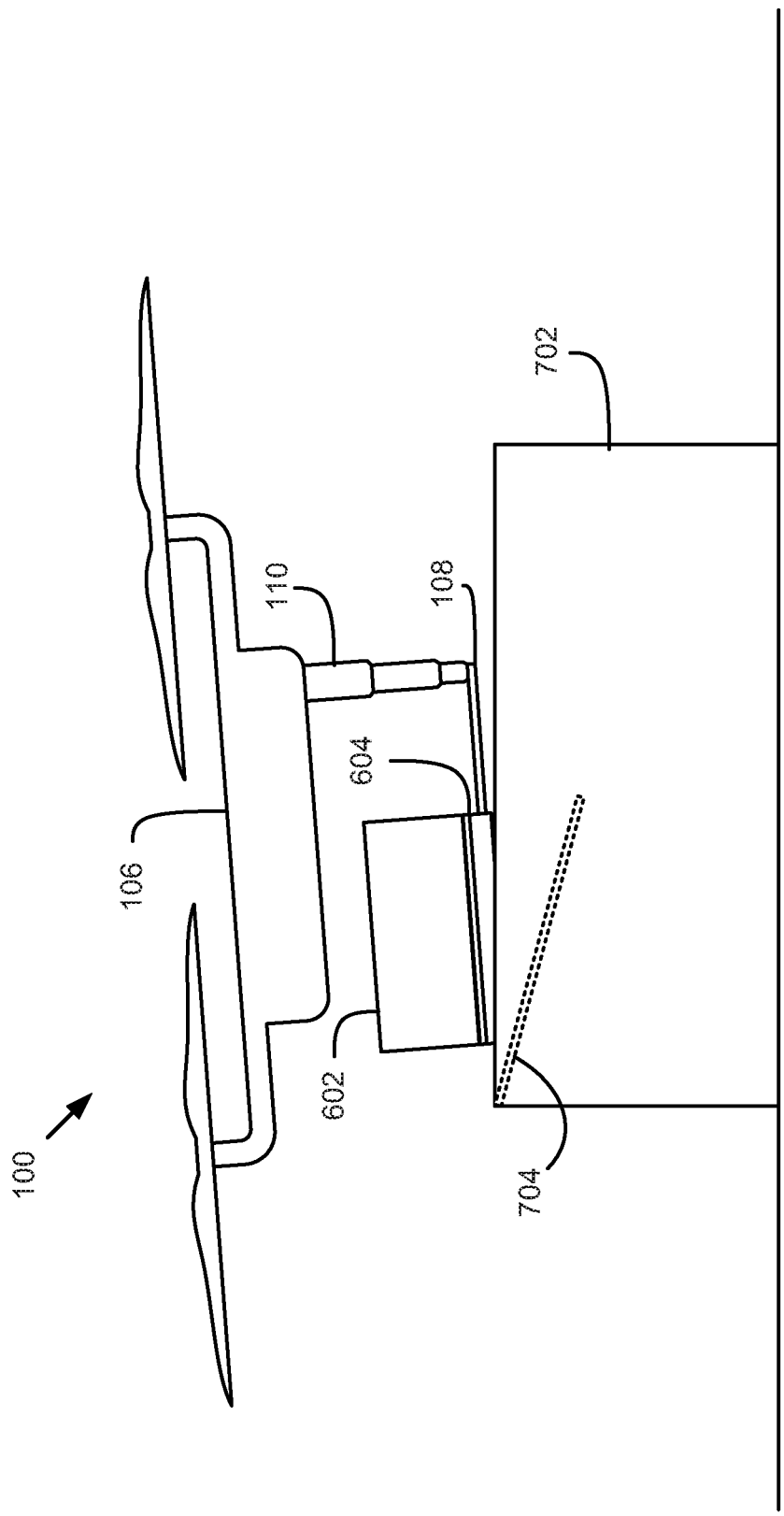

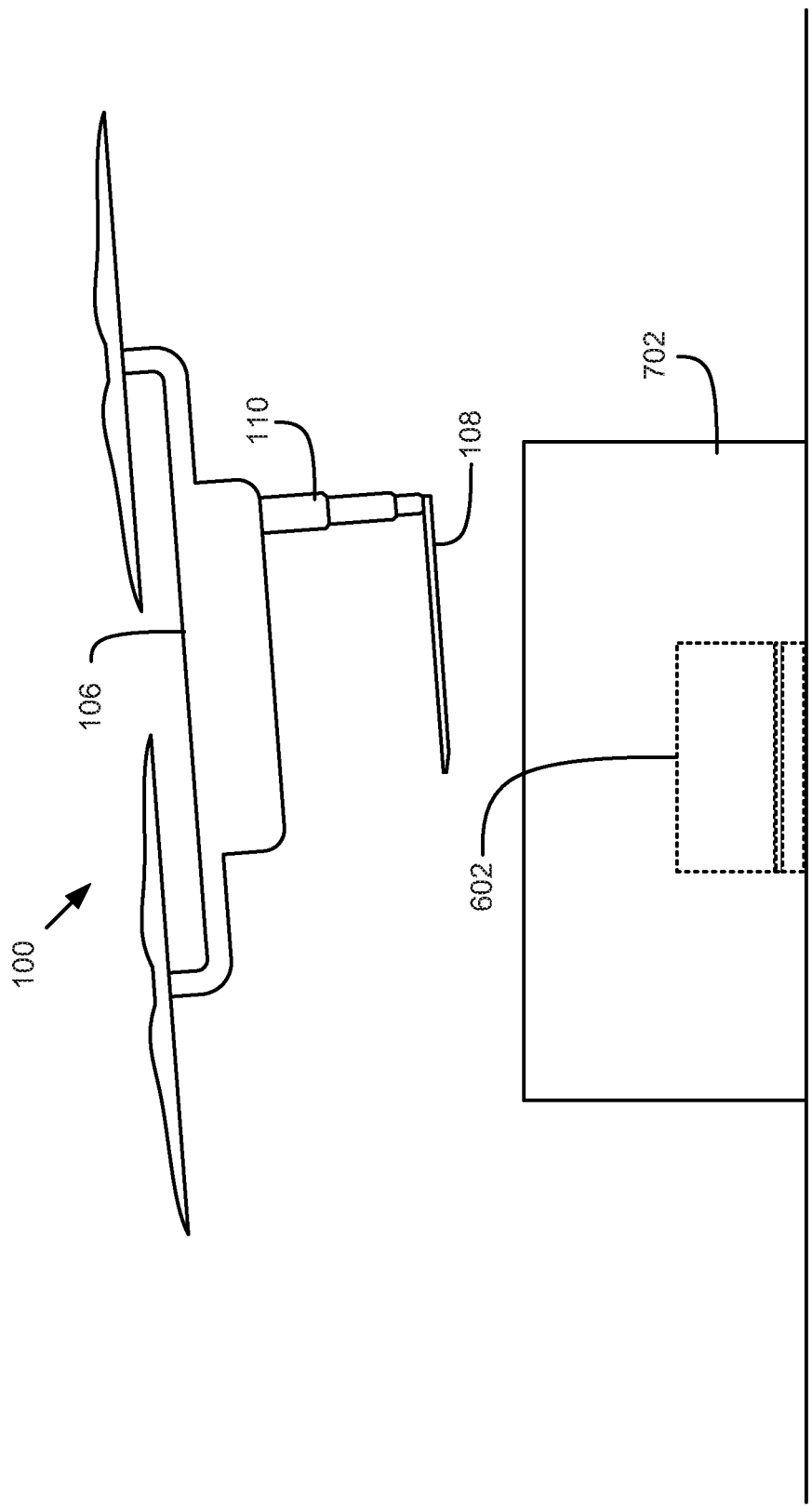

DRONE FORKLIFT

TECHNICAL FIELD

The disclosure relates generally to unmanned aerial vehicles (UAVs) or drones and more particularly relates to systems, methods, and devices for loading and releasing a payload of a drone.

BACKGROUND

Very large numbers of packages are delivered to business, residential, and other locations on a daily basis. Package delivery of small quantities of items is often completed using a delivery truck, van, or other vehicle that is driven by a human driver. The human may drive the vehicle between delivery locations and walk with a package up to or into a building, mailbox, or other location in order to deliver the package. Recently, discussion of delivery using aerial vehicles or drones has been discussed. For example, systems such as Amazon Prime Air® propose the use of a drone to deliver a single package from a warehouse to a destination.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIGS. 6A-6E illustrate a method for package loading, according to one implementation;

FIGS. 7A-7D illustrate a method for package unloading, according to one implementation;

DETAILED DESCRIPTION

Figure 1:
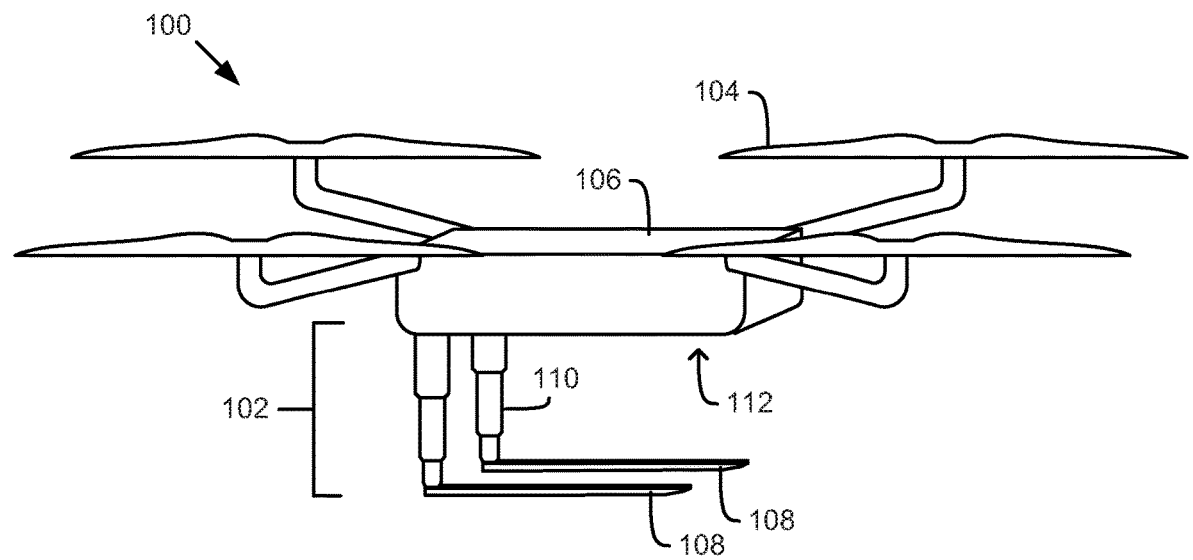
FIG. 1 illustrates a perspective view of a UAV with forklift system, according to one implementation.

Applicants have recognized the need for and developed significant improvements to systems, methods, and devices for package delivery. For example, drone delivery often requires that a human attaches and/or detaches a payload to the drone. Requiring human involvement reduces efficiency and slows the processes. In some cases, drones that can use a hook or mechanical arm may take the human out of the loop, but can only load payloads that are spaced properly for the hook or arms to secure the payload. This is a problem because it does not allow for stacking many packages in a tight space.

In light of the foregoing, applicants have developed a drone forklift and mini crate system used for drone package delivery. In one embodiment, a UAV includes a fork lift system and a length component. The forklift system includes one or more elongated members extending at least partially in a horizontal direction. The forklift system also includes an extension mechanism configured to selectively retract and extend the one or more elongated members relative to an opposing surface. For example, the elongated members may include the tines of the fork or supporting member of the forklift system. The length component is configured to control the extension mechanism to adjust a distance between the opposing surface and the one or more elongated members to accommodate a payload.

In one embodiment, the forklift system allows a drone to pick up packages that are stacked vertically and horizontally in a tight space such as a delivery truck, or from a tightly packed cluster of packages in a warehouse or other location. In one embodiment, the packages, or other payload, may be stacked using cardboard, plastic, or other miniature or size appropriate crates. The cardboard crates may be similar to wooden crates used by traditional heavy forklifts, except they are lighter and may be used with smaller boxes or packages. In one embodiment, a cardboard crate is placed under every package when stacking the boxes.

In order to perform a delivery, a drone or UAV may move or fly to a location of stacked boxes or packages and identify a box to load and/or deliver. In one embodiment, the UAV may scan one or more packages using a sensor that can read a quick response (QR) code, bar code, text, or the like to identify a package. For example, the UAV may include a camera or other optical sensor. In one embodiment, the UAV may scan the one or more packages using another type of reader such as a radio-frequency identification (RFID) tag reader to read RFID tags.

Based on the identity of the package, box, or payload, the UAV may determine metadata about the package. For example, the information read from the tag or code may include the metadata or may include a key to look up the metadata in a database or table. The metadata for the package, box, or payload may include a height of the package, a delivery destination (e.g., GPS or address information), or the like. The height may be relevant so that the UAV can actuate a forklift to create enough space between a forklift and an opposing surface to accommodate the payload so the UAV can pick it up. The UAV may include a forklift mechanism that is actuated using one or more electronically powered telescoping masts. For example, a telescoping mast may actuate a prong or tine of a fork. In one embodiment, multiple prongs or tines may be actuated by a single mast if the mast is rigid and/or powerful enough. An example of a powerful electrically powered telescoping mast may include telescopic cylinders which are actuated with a hydraulic or pneumatic pump.

In one embodiment, in response to determining the height of a package, payload, or box, the UAV may adjust a mast or other extension mechanism to match or exceed the height. When the mast is of sufficient length, the drone may fly or otherwise maneuver to slide the prongs or tines of the fork into a cardboard create underneath the targeted package. A fuselage may be located over the package and may form an opposing surface above the tines or prongs. Once the forks are positioned below the package and the fuselage, or other opposing surface, is positioned above the package, the UAV may telescope or actuate the mast up slightly to create a snug grip on the package. The UAV may then lift off to fly the package to its destination.

Upon arrival at or near a destination, the UAV flies until it is positioned above a receiving container or landing pad. While approximately above the receiving container or landing pad, the drone may rotate or tilt a few degrees from horizontal to allow gravity to pull the package off of the fork prongs or tines. The UAV may also actuate the masts or extension mechanism to increase a distance between the fork and opposing surface to release a grip on the package. While tilting, the UAV may also slowly fly laterally in an opposite direction of the tilting to allow the package to down into a receiving container or onto the landing pad. Once the package is delivered, the UAV may retract the mast and fly away.

Embodiments disclosed herein may allow for reducing the amount of human involvement in drone deliveries. For example, embodiments disclosed herein may allow for a drone to load and unload a package without human involvement. In some embodiments, drones may be able to access the packages even if they are stacked or located in small or tight spaces. For example, a UAV may be able to load a package located within a delivery truck, stacked within a warehouse, or other location. Thus, embodiments disclosed herein may lead to more efficient delivery from a truck or vehicle, not just a warehouse. Furthermore, forklift mechanisms presented herein may allow for secure holding of a package or payload relative to the UAV such that there is no swinging of the payload. Absence of a swinging payload, which may occur with hooks and cables, may make it more difficult and/or dangerous for the UAV to fly or maneuver with the payload.

As used herein the terms "drone" or "unmanned aerial vehicles (UAV)" are given to mean vehicles that are capable of flight and/or navigation with little or no real-time human input. For example, embodiments of drones or aerial vehicles disclosed herein may deliver packages from a ground vehicle to a delivery location with no input from a local or remote human operator. However, it will be appreciated that embodiments of drones or aerial vehicles disclosed herein may also deliver packages from a ground vehicle to a delivery location with some input from a local or remote human operator.

Further embodiments and examples will be discussed in relation to the figures below.

FIG. 1 illustrates a perspective view of a UAV 100 with a fork lift system 102. The UAV 100 includes a plurality of rotors 104 for moving or flying the UAV 100. Motors for the rotors 104 and/or a control system may be located within a fuselage 106. The forklift system 102 extends below the fuselage 106 and includes one or more prongs 108. The prongs are secured relative to the fuselage 106 with one or more masts 110. In the present embodiment, the masts 110 include telescopic cylinders that can be selectively extended or retracted. For example, a pneumatic pump may be used to extend the prongs 108 away from the fuselage 106 and/or retracted the prongs 108 toward the fuselage 106. In FIG. 1, the forklift system 102 is shown in an extended state. A bottom side of the fuselage 106 may provide an opposing surface 112 for the prongs 108. For example, a package or other payload may be pressed or gripped firmly between the prongs and the opposing surface 112 to limit or prevent movement of the payload during flight.

Figure 2:
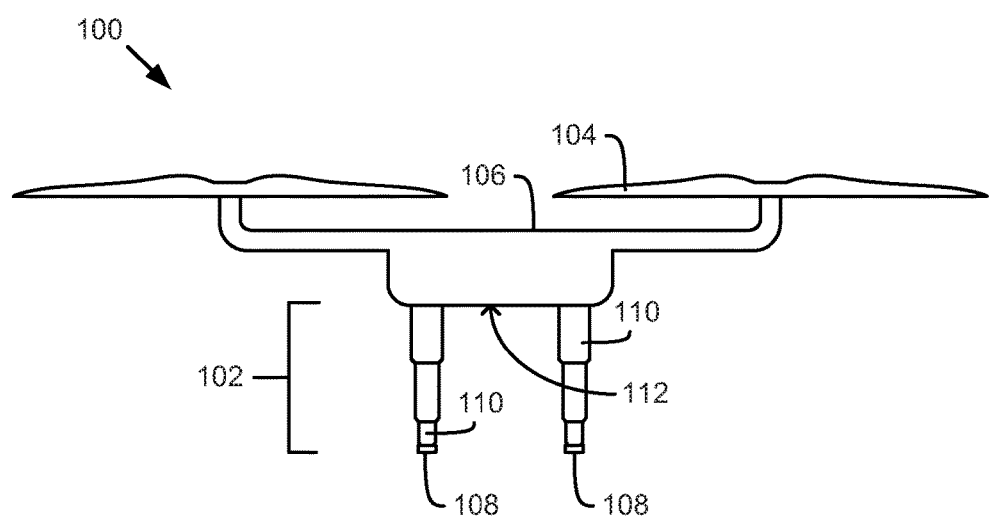
FIG. 2 illustrates a rear view of the UAV with forklift system, according to one implementation.
Figure 3:
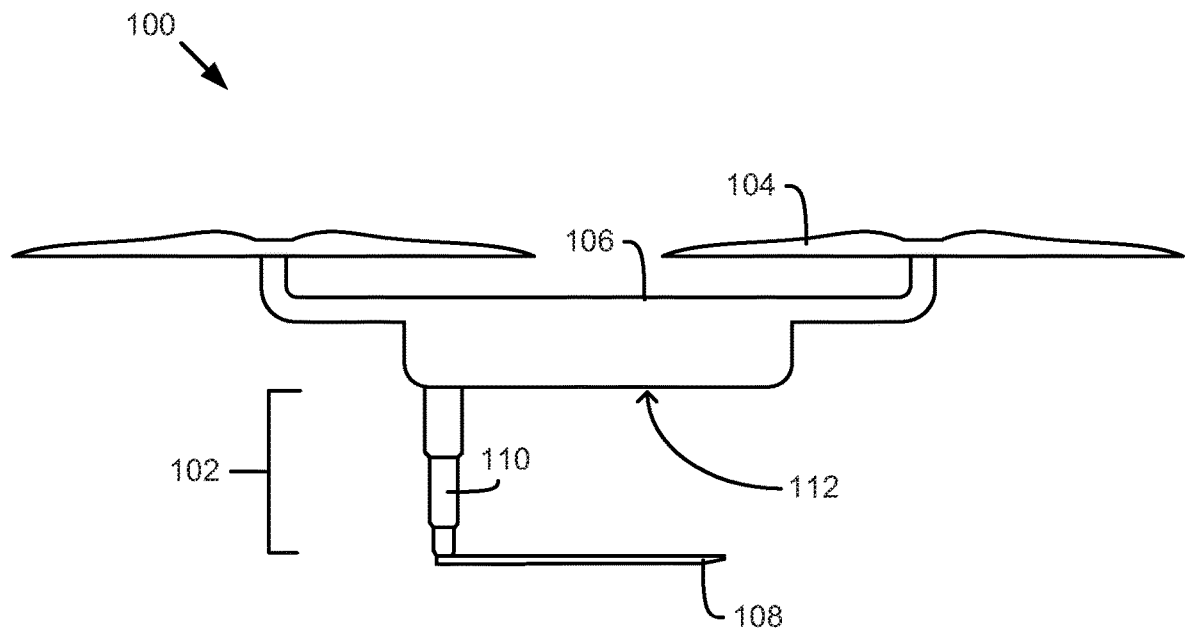
FIG. 3 illustrates a side view of the UAV with forklift system, according to one implementation.
Figure 4:
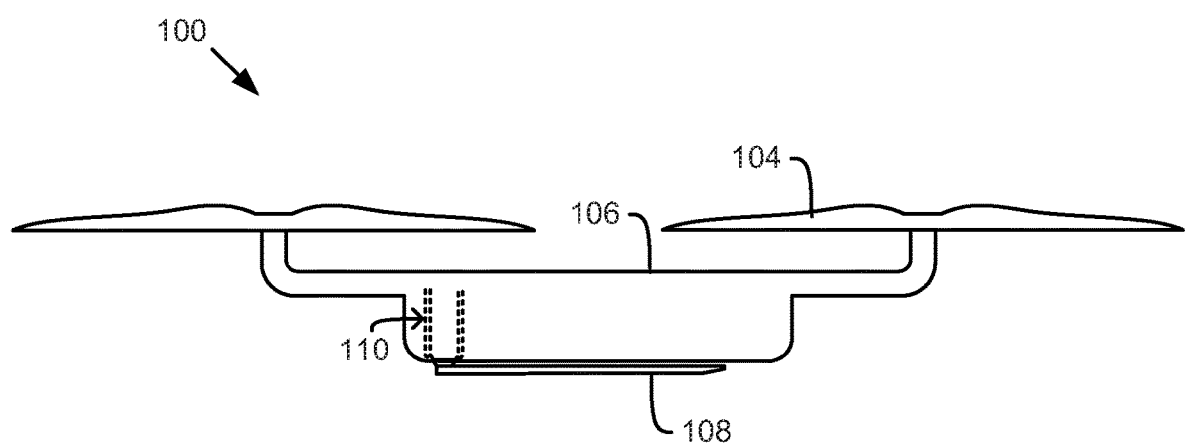
FIG. 4 illustrates a side view of the UAV with the forklift system in a retracted position, according to one implementation.

FIG. 2 illustrates a rear view of the UAV 100 and FIG. 3 illustrates a side view of the UAV 100. FIG. 4 illustrates a side view of the UAV 100 with the forklift system 102 in a collapsed state. Specifically, a mast 110 is shown collapsed within the fuselage 106 and the prongs 108 are shown up close to the bottom side of the fuselage 106 (i.e., the opposing surface 112). In one embodiment, the forklift system 102 may be placed in a collapsed state when no payload is being carried by the UAV 100 to increase safety and/or reduce drag.

Figure 5:
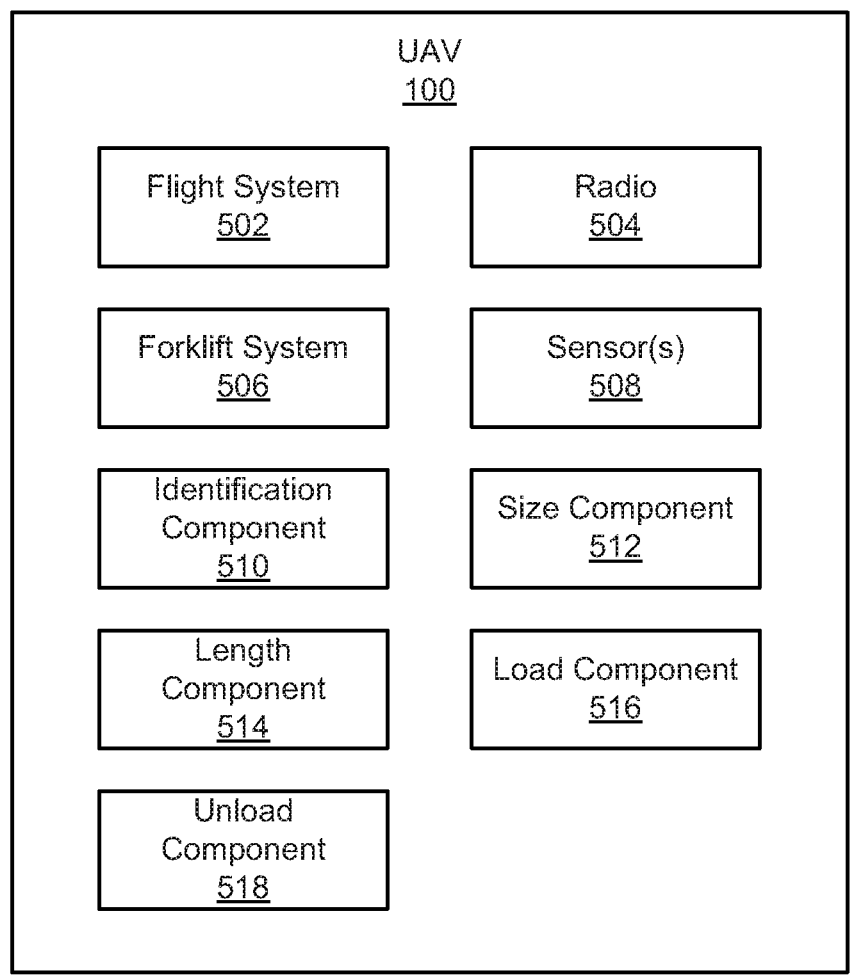
FIG. 5 is a schematic block diagram illustrating example components of a UAV, according to one implementation.

FIG. 5 is a schematic block diagram illustrating example components of a UAV 100, according to one implementation. In the depicted embodiment, the UAV 100 includes a flight system 502, a radio 504, a forklift system 506, sensors 508, an identification component 510, a size component 512, a length component 514, a load component 516, and an unload component 518. The components 502-518 are given by way of illustration only and may not all be included in all embodiments. In fact, some embodiments may include only one or any combination of two or more of the components 502-518. Some of the components 502-518 may be located within a control system within a body or fuselage 106 of a UAV 100.

The flight system 502 is configured to fly the UAV 100. The flight system 502 may include one or more motors, propellers, engines, wings, or the like. For example, the flight system 502 may include one or more motors per rotor. The UAV 100 may include a single or multi rotor air vehicle capable of hovering and vertical take-off and landing. For example, the flight system 502 may include one, two, three, four, five, six, or any other number of rotors. The UAV 100 illustrated in FIG. 1 is an example of a quad-rotor. The flight system 502 may allow the UAV 100 to autonomously fly the UAV 100 between locations, avoid object, or perform other autonomous flight control maneuvers.

The radio 504 may include a radio for communication of instructions and/or for tracking of the UAV 100. The radio 504 may be configured to provide communication between the UAV 100 and a server, monitoring system, or control system. For example, the radio 504 may receive instructions about what package or payload to deliver, a delivery location, information about a size, weight, or other aspect of a payload.

The forklift system 506 allows the UAV 100 to support or hold a package or other payload. In one embodiment, the forklift system 506 includes prongs or tines, which may be placed under package or payload to hold it. For example, the prongs or tines may include elongated members extending at least partially in a horizontal direction (e.g., see FIG. 1). For example, the prongs or tines may extend in a direction in relation to the UAV 100 that is generally horizontal during flight. For example, a UAV 100 may tilt and turn during flight, but may generally have a default horizontal position, such as the position of the UAV 100 when it lands on the ground or when the UAV 100 hovers. The tines or prongs may be substantially horizontal in that they are substantially or approximately parallel to a fuselage 106 or frame of the UAV 100 when the UAV 100 is in a hovering or resting position.

The forklift system 506 also includes an extension mechanism configured to selectively retract and extend the one or more elongated members (e.g., tines or prongs). The extension mechanism may include a mast, rod, telescopic cylinders and/or any length-adjustable mechanism for adjusting a distance of the elongated members (or fork) from a body of the UAV 100. For example, the extension mechanism may extend below the UAV 100 and support the elongated members at some distance from an underside of a fuselage 106 of the UAV 100, or any other opposing surface. The distance between the elongated members and the opposing surface may determine what height of package or payload can be held by the forklift system 506 and/or the UAV 100.

The sensors 508 may include sensors for sensing or identifying objects or surfaces in an environment near the UAV 100. In one embodiment, the sensors 508 may be used to obtain or detect identifying information on a package or payload. For example, the sensors 508 may include an optical sensor or tag reader configured to read identifying information from the tag or barcode. Example sensors 508 may include a camera, RFID tag reader, laser barcode scanner, or the like.

The identification component 510 is configured to identify one or more potential payloads. For example, the sensors 508 may scan/image each package or payload they encounter and the identification component 510 may identify each scanned/imaged package or payload based on the sensor data. In one embodiment, the identification component 510 may identify a package or payload by determining a serial number or other identifier corresponding to the package or payload. For example, a tag or barcode may be read to determine the identity of a payload. In one embodiment, the UAV 100 may receive instruction to deliver a specific package and the identification component 510 may identify packages until a match for the specific package is found.

Based on the identity, or identifying information, the identification component 510 may determine one or more characteristics for the package or payload. In one embodiment, the identification component 510 may determine a serial number or unique identifier for a package and then query, via the radio 504, a database for characteristics or requirements for the package. The identification component 510 may determine one or more dimensions of a package. The dimensions may be needed to allow the forklift system 506 to accommodate and/or hold the package. The identification component 510 may identify a delivery location based on an identity of the payload. The delivery location may include an address, GPS location, or the like. The delivery location may include enough information to allow the UAV 100 to fly to and deliver the package.

The size component 512 is configured to determine a dimension of the payload. For example, the size component 512 may determine a vertical height, horizontal height, or depth of the package. The size component 512 may determine the dimension based on data gathered by the identification component 510 or may determine the size based on a camera image or other data. The size component 512 may also determine a weight or other information about the package relative to delivery.

The length component 514 is configured to control an extension mechanism of the forklift system 506 to adjust a distance between the opposing surface and the one or more elongated members. For example, the length component 514 may actuate a mast of the forklift system 506 so that there is sufficient vertical height between the forks (elongated members) and an underside of a fuselage to accommodate the payload. As another example, the length component 514 may retract the mast completely when there is no payload (e.g., upon unloading a payload and returning to a warehouse, vehicle, or package location). The length component 514 may also actuate the mast to maintain a gripping force on a payload, when applicable. In one embodiment, the length component 514 may adjust the height during flight or may land to perform height adjustments for the forklift system 506.

The load component 516 is configured to control the UAV 100 to load a payload. In one embodiment, the load component 516 causes the UAV 100 to fly or move the UAV 100 to position the payload between the one or more elongated mechanisms and the opposing surface. For example, the load component 516 may cause the flight system 502 to fly the UAV 100 to position the forks or elongated members of the forklift system 506 underneath a target package and an opposing surface (such as an underside of a fuselage) above the target package. For example, the elongated members may be positioned under or in a cardboard crate underneath the package or payload. Once the UAV 100 is positioned, the length component 514 may retract the mast of the forklift system 506 to secure and/or grip the payload between the one or more elongated mechanisms and an opposing surface. When the payload is secured, the UAV 100 may lift off for payload delivery.

The unload component 518 is configured to control the UAV 100 to release or unload a payload. For example, after flying to a delivery destination the unload component 518 may cause the UAV 100 to perform an unload procedure. In one embodiment, the unload component 518 may cause the forklift system 506 to increase a distance between the at least one elongated member and the opposing surface to release the payload. In one embodiment, the unload component 518 may additionally cause the UAV 100 to tilt the UAV 100 in a first direction and fly or move the UAV 100 in a second direction substantially opposite the first direction to cause the payload to slide off of the at least one elongated member. Often, vertical take-off UAVs 100 with rotors tend to move in a direction of tilt rather than in a direction opposite tilt. However, when unloading there are often different forces involved than in generalized flying situations. For example, the movement of the package due to release of the forklift mechanism, contact of the package with the ground, delivery box, or the like may produce forces that allow the UAV 100 to tilt in one direction and fly in the opposite direction. In one embodiment, the unload component 518 may set the package and/or a cardboard crate on the ground or other surface for delivery and then fly sideways to unload the payload.

Figure 6C:
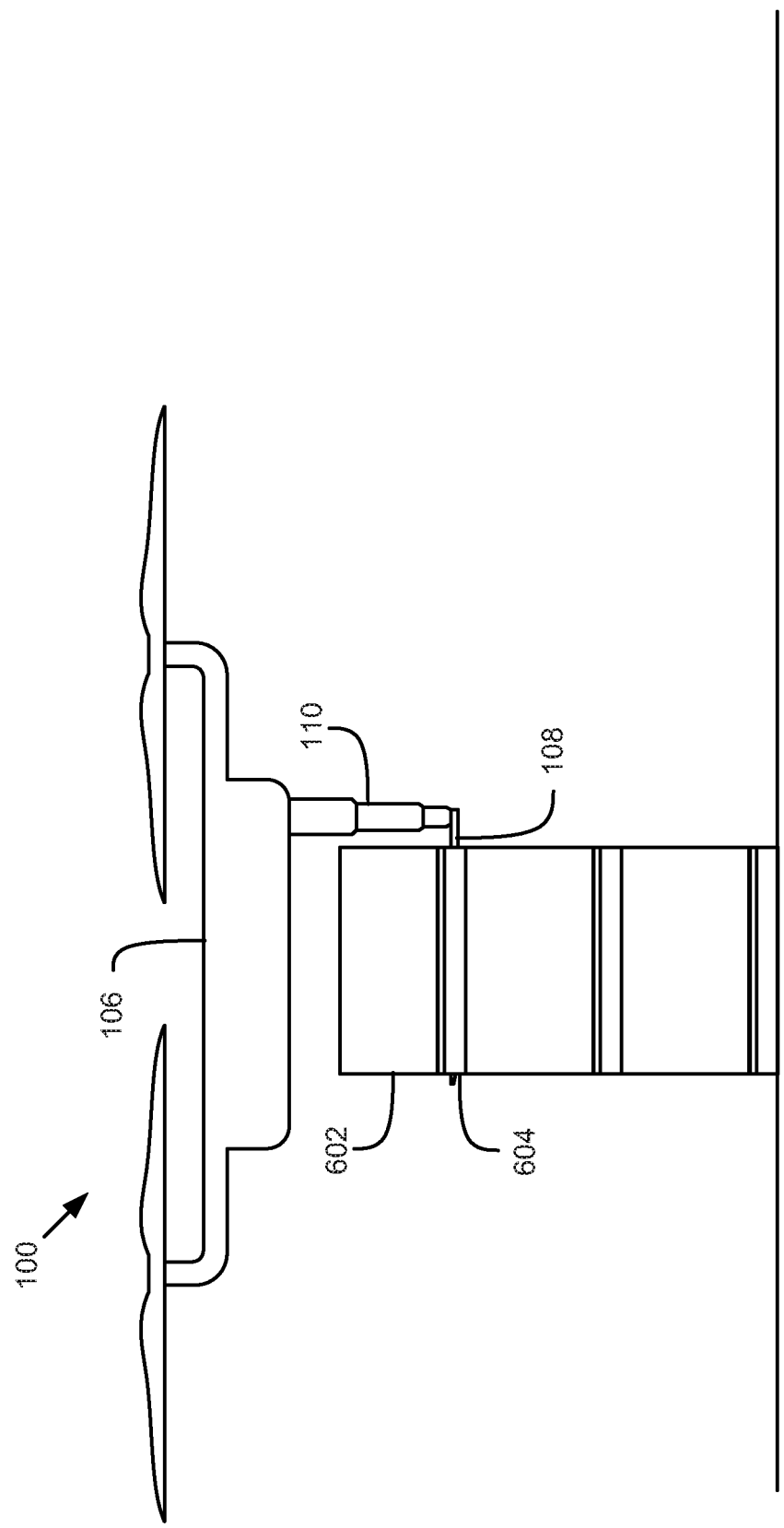
Figure 6D:
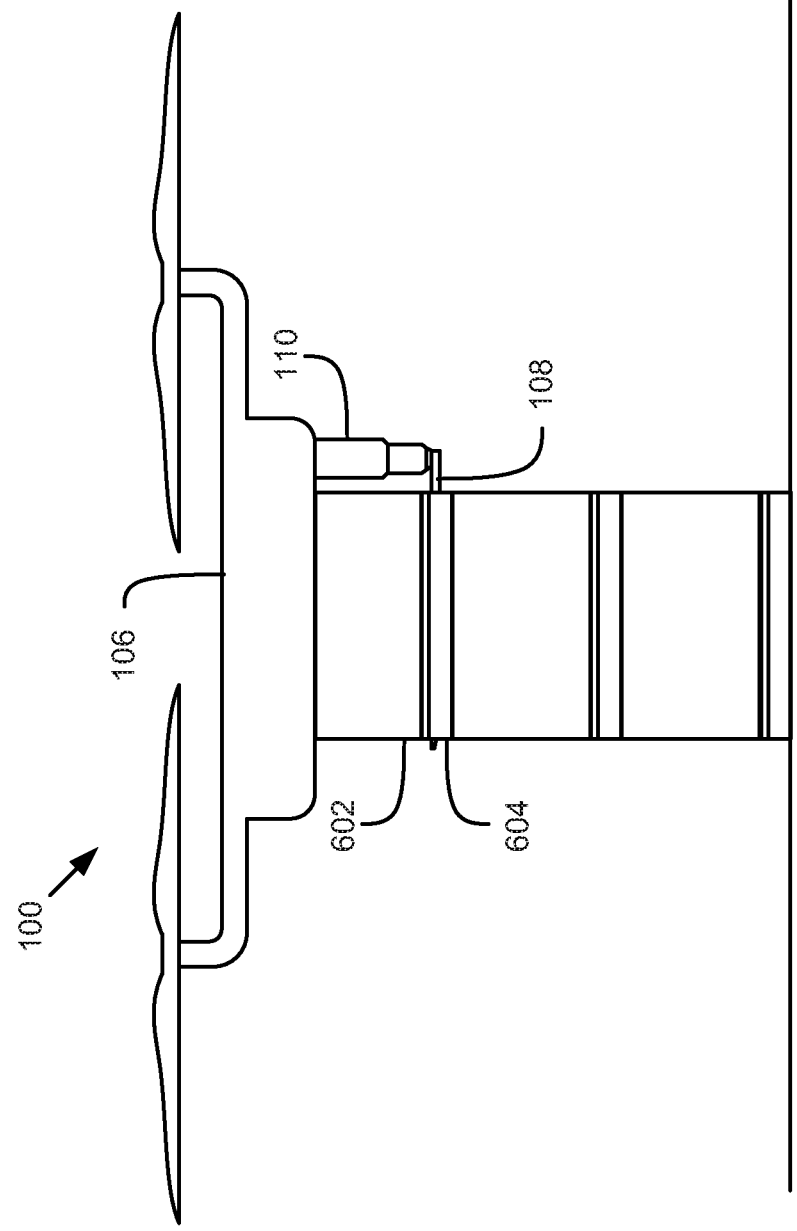

Turning to FIGS. 6A-6E, a method for loading a package is illustrated. Specifically, FIGS. 6A-6E illustrate a side view of a UAV 100 and a package 602 during loading. FIG. 6A shows a UAV 100 hovering near a package 602 that is stacked on a crate 604 on top of a plurality of other packages. The prongs 108 are positioned at a distance from the fuselage 106 to accommodate a height of the package 602. FIG. 6B shows the UAV 100 moving laterally to insert the prongs 108 under the package 602 into a space between packages created by a crate 604. FIG. 6C shows UAV 100 positioned such that the prongs 108 are below the package 602 and the fuselage 106 is above the package. FIG. 6D shows the UAV 100 with the mast 110 retracted enough to apply pressure to the package 600 between the prongs 108 and the fuselage 106. FIG. 6E shows the UAV 100 lifting off with the package 602 and crate 604 secured.

Turning to FIGS. 7A-7D, a method for unloading a package is illustrated. Specifically, FIGS. 7A-7D illustrate a side view of a UAV 100 and a package 602 during unloading. FIG. 7A shows the UAV 100 arriving at a destination and positioned above a delivery box 702. FIG. 7B shows the UAV 100 positioned low above the delivery box 702 and tilting to the left. FIG. 7C shows the UAV 100 releasing the package 602 with an increased distance between the prongs 108 and the fuselage 106 while moving to the right. The package 602 and crate 604 may slide off the prongs and into the delivery box 702. A flap 704 may act as a trap door to allow the package 602 to drop into the box. FIG. 7D shows the package 602 within the delivery box 702. The UAV 100 is free to retract the prongs 108 and return to a package source location.

Figure 8:
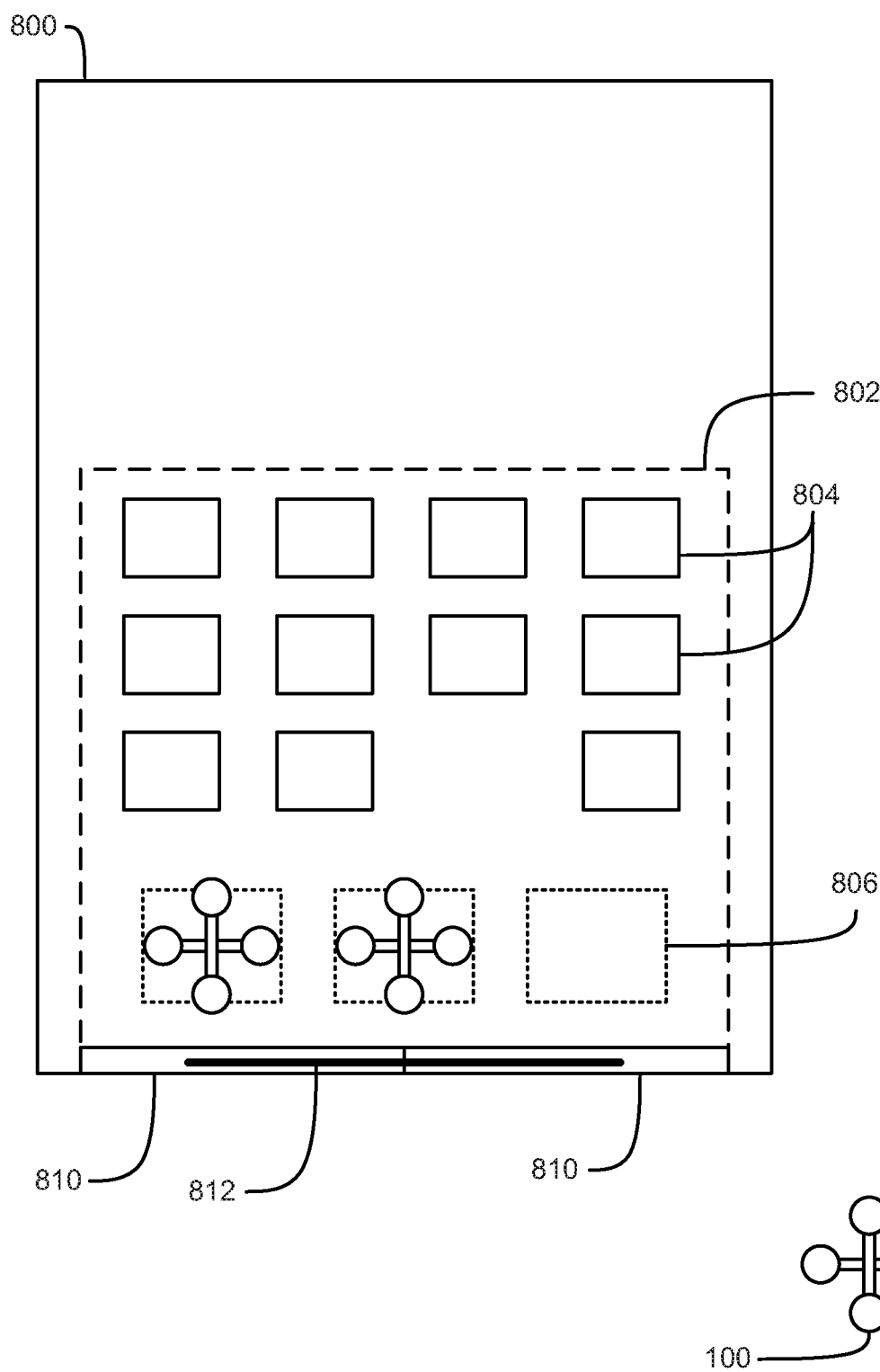
FIG. 8 illustrates a plan view of a vehicle from which a UAV may deliver packages, according to one implementation.

FIG. 8 is a schematic diagram illustrating delivery of package from a vehicle 800 using a UAV 100. The vehicle 800 may include a delivery vehicle for driving a delivery route. The vehicle 800 includes a cargo area 802. The cargo area 802 may receive and/or store a plurality of packages 804 containing items to be delivered. The cargo area 802 may include one or more docking locations 806 for one or more UAVs 100 to land and ride with the automated vehicle 800. For example, the docking locations 806 may include a mat and/or a connector for the UAVs 100 to anchor, power down, and/or recharge. The docking locations 806 may include wired charging connectors or wireless charging coils to charge the UAVs 100.

The vehicle 800 also includes doors 810, which may be opened for loading/or unloading the packages 804. In one embodiment, the doors 810 may be opened to allow a human, robot, or other entity to enter or exit the cargo area 802. The vehicle 800 also includes one or more windows 812. The windows 812 may be sized to allow the UAVs 100, with or without a package, to fly through. For example, one or more windows 812 (such as a window on each door that can be opened to form a single opening) may be opened to allow UAV 100 to exit or enter the cargo area 802. When it is time to deliver a package, UAV 100 may power on, begin flight and retrieve/load one of the packages 804, for example, in a manner discussed herein. The UAV 100 may then fly out the windows 812 with the package and then proceed to a delivery location for placement/delivery of the package. After the package is delivered, the UAV 100 may return to the vehicle 800, fly through the windows 812 and either land on a docking location 806 or retrieve yet another package for delivery. In one embodiment, a UAV 100 with a forklift mechanism may be used to quickly, efficiently, and/or autonomously load packages within the tight confines of the vehicle 800 and deliver the packages.

Figure 9:
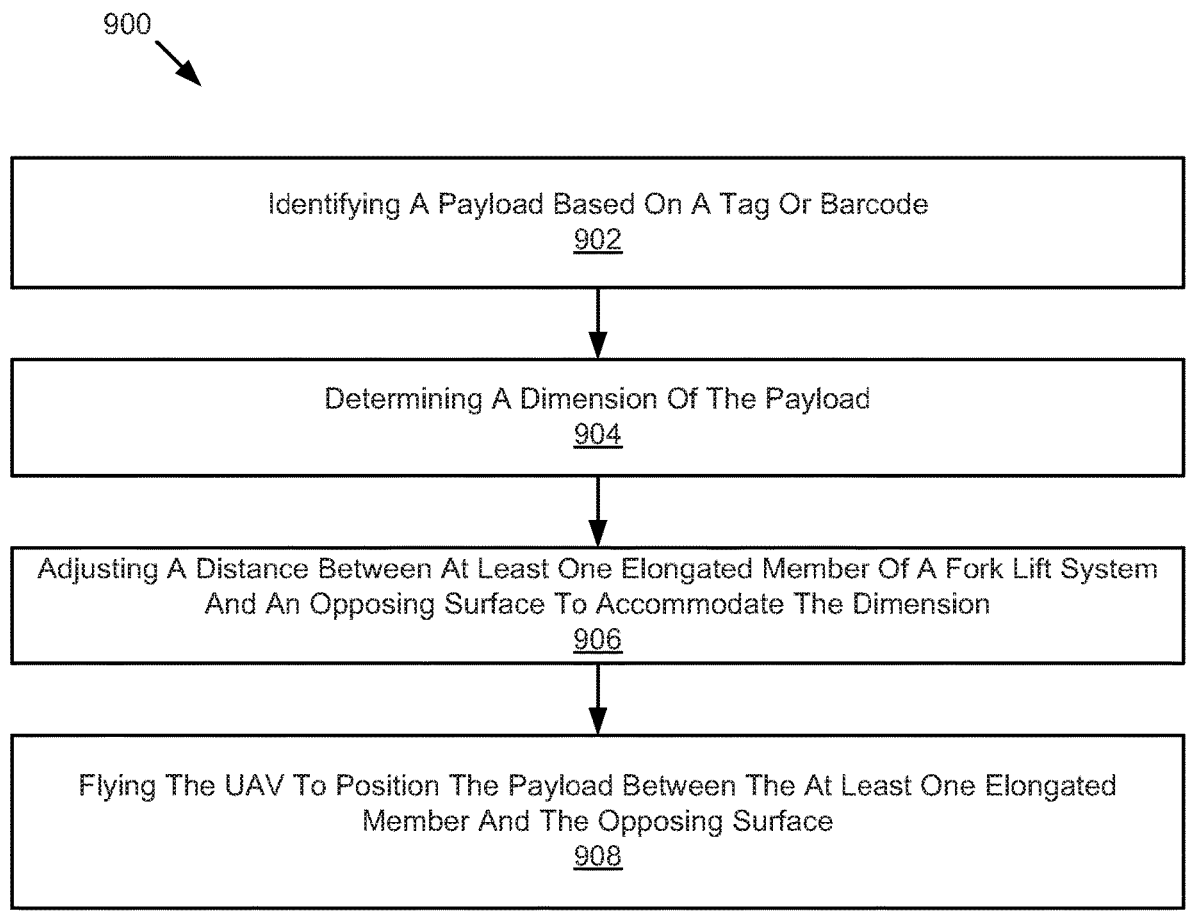
FIG. 9 is a schematic flow chart diagram illustrating a method for package delivery, according to one implementation.

Referring now to FIG. 9, a schematic flow chart diagram of a method 900 for package delivery is illustrated. The method 900 may be performed by a UAV, such as the UAV 100 of FIG. 1 or 5.

The method 900 begins and an identification component 510 identifies at 902 a payload based on a tag or barcode. A size component 512 determines at 904 a dimension of the payload. A length component 514 adjusts at 906 a distance between at least one elongated member of a fork lift system and an opposing surface to accommodate the dimension. A load component 516 flies at 908 the UAV to position the payload between the at least one elongated member and the opposing surface.

EXAMPLES

The following examples pertain to further embodiments.

Example 1 is a UAV that includes a forklift system and a length component. The forklift system includes one or more elongated members extending at least partially in a horizontal direction. The forklift system also includes an extension mechanism configured to selectively retract and extend the one or more elongated members relative to an opposing surface. The component is configured to control the extension mechanism to adjust a distance between the opposing surface and the one or more elongated members to accommodate a payload.

In Example 2, the extension mechanism as in Example 1 includes one or more telescopic cylinders.

In Example 3, the UAV as in any of Examples 1-2 further includes an identification component configured to identify a payload based on one or more of a tag or barcode on the payload.

In Example 4, the UAV as in any of Examples 1-3 further includes an optical sensor or tag reader configured to read identifying information from the tag or barcode.

In Example 5, the UAV as in any of Examples 1-4 further includes a size component configured to determine a dimension of the payload, wherein the length component is configured to adjust the distance to accommodate the dimension of the payload.

In Example 6, the UAV as in any of Examples 1-5 further includes a load component configured to fly or move the UAV to position the payload between the one or more elongated mechanisms and the opposing surface. The length component is further configured to adjust the distance to grip the payload using the one or more elongated mechanisms and the opposing surface.

In Example 7, the UAV as in any of Examples 1-6 further includes an unload component configured to fly or move the UAV to release the payload.

Example 8 is a method for delivering a payload using an UAV. The method includes identifying a payload based on a tag or barcode and determining a dimension of the payload. The method includes adjusting a distance between at least one elongated member of a fork lift system and an opposing surface to accommodate the dimension. The method includes flying the UAV to position the payload between the at least one elongated member and the opposing surface.

In Example 9, the method of Example 8 further includes, in response to flying the UAV to position the payload between the at least one elongated member and the opposing surface, adjusting the distance between the at least one elongated member and the opposing surface to grip the payload between the at least one elongated member and the opposing surface.

In Example 10, the method as in any of Examples 8-9 further includes flying the UAV to a delivery location. The method further includes increasing the distance between the at least one elongated member and the opposing surface to release the payload.

In Example 11, the method as in any of Examples 8-10 further includes tilting the UAV in a first direction. The method further includes flying the UAV in a second direction substantially opposite the first direction whereby the payload slides off of the at least one elongated member.

In Example 12, the opposing surface as in any of Examples 8-11 includes an underside of the UAV, wherein the at least one elongated member extends in a substantially horizontal direction. Adjusting the distance includes actuating an extension mechanism configured to selectively retract and extend the at least one elongated member below the opposing surface.

In Example 13, determining a dimension of the payload as in any of Examples 8-12 includes determining the payload based on an identity of the payload.

In Example 14, the method as in any of Examples 8-13 further includes identifying a delivery location based on an identity of the payload.

Example 15 is a computer readable storage media storing instructions that, when executed by one or more processors, cause the processors to identify a payload based on a tag or barcode based on sensor data of an UAV. The instructions cause the processors to determine a dimension of the payload. The instructions cause the processors to adjust a distance between at least one elongated member of a fork lift system and an opposing surface to accommodate the dimension. The instructions cause the processors to fly the UAV to position the payload between the at least one elongated member and the opposing surface.

In Example 16, the instructions as in Example 15 further cause the processors to, in response to flying the UAV to position the payload between the at least one elongated member and the opposing surface, adjust the distance between the at least one elongated member and the opposing surface to grip the payload between the at least one elongated member and the opposing surface.

In Example 17, the instructions as in any of Examples 15-16 further cause the processors to fly the UAV to a delivery location and increase the distance between the at least one elongated member and the opposing surface to release the payload.

In Example 18, the instructions as in any of Examples 15-17 further cause the processors to tilt the UAV in a first direction and fly the UAV in a second direction substantially opposite the first direction, whereby the payload slides off of the at least one elongated member.

In Example 19, the opposing surface as in any of Examples 15-18 includes an underside of the UAV, wherein the at least one elongated member extends in a substantially horizontal direction. The instructions cause the processors to adjust the distance by actuating an extension mechanism configured to selectively retract and extend the at least one elongated member below the opposing surface.

In Example 20, the instructions as in any of Examples 15-19 further cause the processors to determine a delivery location based on an identity of the payload.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. An unmanned aerial vehicle (UAV) comprising:
   a fork lift system comprising:
   one or more elongated members extending at least partially in a horizontal direction;
   an extension mechanism configured to selectively retract and extend the one or more elongated members relative to an opposing surface; and
   a length component configured to control the extension mechanism to adjust a distance between the opposing surface and the one or more elongated members to accommodate a payload,
   wherein the extension mechanism comprises one or more telescopic cylinders,
   wherein responsive to no payload carrying, the extension mechanism is further configured to be collapsed within a fuselage of the UAV, leaving the one or more elongated members outside the fuselage and close to the opposing surface.

2. The UAV of claim 1, further comprising an identification component configured to identify a payload based on one or more of a tag or barcode on the payload.

3. The UAV of claim 2, further comprising an optical sensor or tag reader configured to read identifying information from the tag or barcode.

4. The UAV of claim 1, further comprising a size component configured to determine a dimension of the payload, wherein the length component is configured to adjust the distance to accommodate the dimension of the payload.

5. The UAV of claim 1, further comprising a load component configured to fly or move the UAV to position the payload between the one or more elongated members and the opposing surface, wherein the length component is further configured to adjust the distance to grip the payload using the one or more elongated members and the opposing surface.

6. The UAV of claim 1, further comprising an unload component configured to fly or move the UAV to release the payload, wherein the unload component is further configured to cause the UAV to tilt the UAV in a first direction and fly or move the UAV in a second direction substantially opposite the first direction to cause the payload to slide off of at least one of the one or more elongated members.

7. A method for delivering a payload using an unmanned aerial vehicle (UAV), the method comprising:
   identifying a payload based on a tag or barcode;
   determining a dimension of the payload;
   adjusting, via an extension mechanism of a fork lift system of the UAV, a distance between at least one elongated member of the fork lift system and an opposing surface to accommodate the dimension;
   flying the UAV to position the payload between the at least one elongated member and the opposing surface; and
   collapsing the extension mechanism within a fuselage of the UAV, leaving the at least one elongated member outside the fuselage and close to the opposing surface.

8. The method of claim 7, further comprising, in response to flying the UAV to position the payload between the at least one elongated member and the opposing surface, adjusting the distance between the at least one elongated member and the opposing surface to grip the payload between the at least one elongated member and the opposing surface.

9. The method of claim 7, further comprising:
   flying the UAV to a delivery location; and
   increasing the distance between the at least one elongated member and the opposing surface to release the payload.

10. The method of claim 9, further comprising:
    tilting the UAV in a first direction; and
    flying the UAV in a second direction substantially opposite the first direction;
    whereby the payload slides off of the at least one elongated member.

11. The method of claim 7, wherein the opposing surface comprises an underside of the UAV, wherein the at least one elongated member extends in a substantially horizontal direction, and wherein adjusting the distance comprises actuating the extension mechanism configured to selectively retract and extend the at least one elongated member below the opposing surface.

12. The method of claim 7, wherein determining the dimension of the payload comprises determining the payload based on an identity of the payload.

13. The method of claim 7, further comprising identifying a delivery location based on an identity of the payload.

14. Non-transitory computer readable storage media storing instructions that, when executed by one or more processors, cause the processors to:
  identify a payload based on a tag or barcode based on sensor data of an unmanned aerial vehicle (UAV);
  determine a dimension of the payload;
  adjust, via an extension mechanism of a fork lift system of the UAV, a distance between at least one elongated member of the fork lift system and an opposing surface to accommodate the dimension;
  fly the UAV to position the payload between the at least one elongated member and the opposing surface; and
  collapsing the extension mechanism within a fuselage of the UAV, leaving the at least one elongated member outside the fuselage and close to the opposing surface.

15. The non-transitory computer readable storage media of claim 14, wherein the instructions further cause the processors to, in response to flying the UAV to position the payload between the at least one elongated member and the opposing surface, adjust the distance between the at least one elongated member and the opposing surface to grip the payload between the at least one elongated member and the opposing surface.

16. The non-transitory computer readable storage media of claim 14, wherein the instructions further cause the processors to:
  fly the UAV to a delivery location; and
  increase the distance between the at least one elongated member and the opposing surface to release the payload.

17. The non-transitory computer readable storage media of claim 16, wherein the instructions further cause the processors to:
  tilt the UAV in a first direction; and
  fly the UAV in a second direction substantially opposite the first direction;
  whereby the payload slides off of the at least one elongated member.

18. The non-transitory computer readable storage media of claim 14, wherein the opposing surface comprises an underside of the UAV, wherein the at least one elongated member extends in a substantially horizontal direction, and wherein the instructions cause the processors to adjust the distance by actuating the extension mechanism configured to selectively retract and extend the at least one elongated member below the opposing surface.

19. The non-transitory computer readable storage media of claim 14, wherein the instructions further cause the processors to determine a delivery location based on an identity of the payload.

* * * * *